(12) United States Patent
Büchner et al.

(10) Patent No.: US 8,980,407 B2
(45) Date of Patent: Mar. 17, 2015

(54) LINERLESS LABEL

(75) Inventors: Jörg Büchner, Bergisch Gladbach (DE); Harald Kraus, Leverkusen (DE); Pantea Nazaran, Köln (DE); Dirk Dijkstra, Köln (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/702,830

(22) PCT Filed: Jun. 3, 2011

(86) PCT No.: PCT/EP2011/059187
§ 371 (c)(1),
(2), (4) Date: Feb. 20, 2013

(87) PCT Pub. No.: WO2011/154317
PCT Pub. Date: Dec. 15, 2011

(65) Prior Publication Data
US 2013/0143010 A1    Jun. 6, 2013

(30) Foreign Application Priority Data
Jun. 8, 2010   (EP) .................................... 10005881

(51) Int. Cl.
| | | |
|---|---|---|
| B32B 3/00 | (2006.01) | |
| C09J 133/14 | (2006.01) | |
| C08G 18/08 | (2006.01) | |
| C08G 18/10 | (2006.01) | |
| C08G 18/32 | (2006.01) | |
| C08G 18/42 | (2006.01) | |
| C08G 18/75 | (2006.01) | |
| C09J 175/02 | (2006.01) | |
| C09J 7/02 | (2006.01) | |
| G09F 3/10 | (2006.01) | |

(52) U.S. Cl.
CPC ........... *C09J 133/14* (2013.01); *C08G 18/0828* (2013.01); *C08G 18/10* (2013.01); *C08G 18/3275* (2013.01); *C08G 18/4216* (2013.01); *C08G 18/755* (2013.01); *C09J 175/02* (2013.01); *C09J 7/0203* (2013.01); *G09F 3/10* (2013.01); *C08G 2170/80* (2013.01)
USPC ................. 428/195.1; 428/343; 428/355 AC; 427/208.4

(58) Field of Classification Search
CPC ............................... C09J 133/08; C08L 33/08
USPC .......................... 428/343, 355 AC; 427/208.4
See application file for complete search history.

(56) References Cited

U.S. PATENT DOCUMENTS

| | | |
|---|---|---|
| 5,354,588 A | 10/1994 | Mitchell et al. |
| 6,074,747 A | 6/2000 | Scholz et al. |
| 6,465,101 B1 | 10/2002 | MacGregor et al. |
| 6,465,104 B1 | 10/2002 | Krebs et al. |
| 2007/0054117 A1 | 3/2007 | Katchko et al. |
| 2008/0241529 A1 | 10/2008 | Bauer et al. |
| 2010/0055370 A1 * | 3/2010 | Diehl et al. ................ 428/40.6 |
| 2010/0120931 A1 | 5/2010 | Zajaczkowski et al. |

FOREIGN PATENT DOCUMENTS

| | | |
|---|---|---|
| DE | 19724648 A1 | 12/1998 |
| DE | 10227084 A1 | 1/2004 |
| EP | 1975217 A2 | 10/2008 |
| WO | WO-00/39181 A1 | 7/2000 |

OTHER PUBLICATIONS

European Search Report for EP 10005881.7 mailed Sep. 14, 2010.
International Search Report for PCT/EP2011/059187 mailed Jul. 8, 2011.
Translation of International Report on Patentability (IPRP) and Written Opinion in corresponding international application.

* cited by examiner

*Primary Examiner* — Elizabeth Mulvaney
(74) *Attorney, Agent, or Firm* — Drinker Biddle & Reath LLP

(57) ABSTRACT

The invention relates to an aqueous adhesive composition containing at least one acrylate polymer with a glass transition temperature Tg>50° C. and at least one amorphous polyurethane or polyurethane-polyurea polymer with a glass transition temperature Tg<+10° C., the use of the adhesive compositions for the manufacture of heat-activated adhesive layers, and planar formations containing adhesive layers based on the adhesive composition.

21 Claims, No Drawings

LINERLESS LABEL

RELATED APPLICATIONS

This application is a national stage application (under 35 U.S.C. §371) of PCT/EP2011/059187, filed Jun. 3, 2011, which claims benefit of European application 10005881.7, filed Jun. 8, 2010.

The invention relates to an aqueous adhesive composition containing at least one acrylate polymer with a glass transition temperature Tg>+50° C. and at least one amorphous polyurethane or polyurethane-polyurea polymer with a glass transition temperature Tg<+10° C., the use of the adhesive compositions for the manufacture of heat-activated adhesive layers and planar formations containing adhesive layers based on the adhesive composition.

Labels are coated with a pressure sensitive adhesive layer on one face. Pressure sensitive adhesives are by definition tacky at room temperature. They may be applied to the substrate sheet as an aqueous dispersion, a solvent-containing preparation or a hot melt. For industrial applications the labels are employed as rolls (large rolls). Due to the permanent tackiness of the adhesive layer the rolls have to be protected against blocking by inserting a release paper (e.g. silicone paper). The use of a release paper or a release film leads to costs for the use of raw materials as well as additional costs for the disposal of the release paper or the release film.

In recent years increased efforts have therefore been made to dispense with the release paper or the release film. In doing so, work mainly concentrated on the development of anti-adhesive coats for the finishing of the label top face. This is intended to prevent blocking of the rolls. The application of an anti-adhesive coating to the label top face, however, involves additional costs. By way of example, U.S. Pat. No. 6,074,747 discloses anti-adhesive coatings for labels, adhesive tapes and postage stamps of silicone, fluoroacrylate and polyurethane to avoid a release paper.

U.S. Pat. No. 5,354,588 discloses a tie coat which facilitates the adherence of the pressure sensitive adhesive to the substrate. This is intended to prevent the transfer of the pressure sensitive adhesive to the adhesive-free face during the unrolling of the label material. These pressure sensitive adhesive substances are based on acrylate polymer.

DE 19 724 648 A1 discloses applying the pressure sensitive coating in screen application in combination with an anti-adhesive coating having a roughness of at least 1 μm. This makes it easy to unroll the labels without using a release paper. The screen application may be made with dispersion adhesives, but preferably with hot-melt adhesives, with the typical formulations used for pressure sensitive adhesive applications being produced with natural and synthetic rubber as well as acrylates.

DE 10 227 084 A1 describes large roll label material without a release paper, using a release lacquer on the face of the label structure opposite the adhesive layer. Using the release lacquer prevents blocking of the roll material. The pressure sensitive acrylate adhesives described in DE 1 569 898 A1 are applied.

All these methods have the drawback that the adhesive itself is not free of blocking and consequently additional layers are required.

US 2007/0054117 discloses heat-sealable adhesive papers coated with heat-activated dispersion polymers and adapted for the "linerless label" application, among others. In order to avoid blocking, polymers with a melting temperature>220° F. (104.4° C.) and a glass transition temperature Tg>50° F. (+10° C.) are required. The drawback is that, owing to these polymer properties, the adhesive papers can only be sealed at high temperatures and pressures.

Thus one object of the present invention was to provide an aqueous adhesive composition which when used in adhesive layers on rolls does not lead to a blocking of the label layers even at high winding tensions and at temperatures up to 50° C., without requiring a release paper, and can at the same time be activated at temperatures<90° C.

The object was achieved by providing an aqueous adhesive composition containing at least one acrylate polymer with a glass transition temperature Tg in the range from +50° C. to +90° C. and at least one amorphous polyurethane or polyurethane-polyurea polymer with a glass transition temperature Tg in the range from −50° C. to +10° C., the glass transition temperature being determined by means of a DSC measurement according to DIN 65467 at a heating rate of 20 K/min.

Preferably, the acrylate polymer has a glass transition temperature Tg in the range from 50° C. to 80° C., more preferably in the range from 50° C. to 70° C.

Preferably, the polyurethane or polyurethane-polyurea polymer has a glass transition temperature Tg in the range from −50° C. to 5° C., more preferably in the range from −10° C. to +5° C.

The glass transition temperature is determined by Differential Scanning calorimetry (DSC) according to the DIN 65467 standard at a heating rate of 20 K/min with a definition of Tg as the midpoint temperature (tangent method).

Below the glass transition temperature, amorphous polymers are brittle and rigid. This property is due to the immobility of the "frozen" polymer chains. When the glass transition temperature is exceeded the molecular chains become movable relative to one another and the polymer softens, the degree of softening depending on the type of the polymer, the molecular weight of the polymer and the temperature. Contrary to the semi-crystalline polymers, amorphous polymers show only a glass transition stage during the transition from the brittle, rigid state to the softened rubbery state in the DSC measurement according to DIN 65467. A melt peak indicating a semi-crystallinity of the polymer does not occur in the DSC measurements.

Preferably, the adhesive composition contains 10 to 90% by weight of acrylate polymers and 10 to 90% by weight of polyurethane or polyurethane-polyurea polymers; more preferably, the adhesive composition contains 30 to 60% by weight of acrylate polymers and 40 to 70% by weight of polyurethane or polyurethane-polyurea polymers.

The adhesive compositions according to the invention have preferably a solid matter content of 10 to 70% by weight, more preferably 25 to 60% by weight and most preferably 35 to 55% by weight.

In a preferred embodiment, the components of the adhesive composition are selected such that after their use for the manufacture of the heat-activated adhesive layers, the storage modulus G' of the heat-activated adhesive layers at 50° C.—as measured in the frequency range from 1 rad/s to 100 rad/s—is always above the loss modulus G", with the value for the storage modulus G' at 1 rad/s being between $1*10^5$ Pa and $1*10^8$ Pa and more preferably between $1*10^5$ Pa and $1*10^6$ Pa.

At 70° C., the value for the storage modulus G' of the heat-activated adhesive layers is below the loss modulus G" or the value for the storage modulus G' corresponds to the loss modulus G" in the frequency range between 1 rad/s and 100 rad/s at one point (tan δ=1), with the value for the storage modulus G' at 1 rad/s preferably being between $1*10^4$ Pa and $1*10^7$ Pa and more preferably between $1*10^5$ Pa and $1*10^6$ Pa.

At 90° C., the storage modulus G' in the entire frequency range between 1 rad/s and 100 rad/s is always below the loss modulus G", with the value for the storage modulus G' at 1 rad/s preferably being between $1*10^3$ Pa and $1*10^6$ Pa and more preferably between $1*10^3$ Pa and $1*10^5$ Pa.

Preferably, the heat-activated adhesive layer has at 50° C. a storage modulus G' at 1 rad/s of between $1*10^5$ Pa and $1*10^8$ Pa, at 70° C. a storage modulus G' of between $1*10^4$ Pa and $1*10^7$ Pa and at 90° C. a storage modulus G' at 1 rad/s of between $1*10^3$ Pa and $1*10^6$ Pa.

Preferably, the polyurethane or polyurethane-polyurea polymer has a weight average molecular weight in the range from 15,000 to 150,000 g/mol, more preferably in the range from 20,000 to 80,000 g/mol, most preferably in the range from 25,000 to 45,000 g/mol.

Preferably, the polyurethane or polyurethane-polyurea polymer in the dispersion has an average particle diameter in the range from 30 to 400 nm, more preferably in the range from 100 to 300 nm, most preferably in the range from 150 to 280 nm. The particle diameter is determined by laser correlation spectroscopy (apparatus: Malvern Zetasizer 1000, Malvern Instruments LTD), and the Z-averages are given.

The polyurethane or polyurethane-polyurea polymer contain as structural components:

(A) at least one diol and/or polyol component, (B) at least one di- and/or polyisocyanate component, (C) at least one component having sulphonate and/or carboxylate groups, (D) mono-, di- and/or tri-amino-functional and/or hydroxyamino-functional compounds, as appropriate, (E) other isocyanate-reactive compounds, as appropriate.

Suitable diol and/or polyol components A) are compounds with at least two hydrogen atoms being reactive with isocyanates and having an average molecular weight of 62 to 18,000, preferably 62 to 4,000 g/Mol. Examples of suitable structural components are polyethers, polyesters, polycarbonates, polyacetones and polyamides. Preferred polyols A) have 2 to 4, more preferably 2 to 3 hydroxyl groups, most preferably 2 hydroxyl groups. Mixtures of different compounds of this type are also conceivable.

Possible polyester polyols include in particular linear polyester diols and slightly branched polyester polyols such as may be prepared in a known manner from aliphatic, cycloaliphatic or aromatic di- or polycarboxylic acids such as succinic, methyl succinic, glutaric, adipic, pimelic, suberic, azelaic, sebacic, nonane dicarboxylic, decane dicarboxylic, terephthalic, isophthalic, o-phthalic, tetrahydrophthalic, hexahydrophthalic, cyclohexane-dicarboxylic, maleic, fumaric, malonic or trimellitic acid as well as acid anhydrides such as o-phthalic, trimellitic or succinic acid anhydride or mixtures thereof with polyhydric alcohols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylolcyclohexane, octanediol-1,8, decanediol-1,10, dodecanediol-1,12 or mixtures thereof, also using higher functional polyols such as trimethylolpropane, glycerine or pentaerythrite, where appropriate. Of course, cycloaliphatic and/or aromatic di- and polyhydroxyl compounds are also conceivable for the manufacture of the polyester polyols. Instead of the free polycarboxylic acid, the corresponding polycarboxylic acid anhydrides or corresponding polycarboxylic acid esters of low-order alcohols or mixtures thereof may also be used for the manufacture of the polyesters.

Of course, the polyester polyols may be homo- or copolymers of lactones which preferably are obtained by addition of lactones or lactone mixtures such as butyrolactone, ε-caprolactone and/or methyl-ε-caprolactone to suitable di- or higher functional starter molecules such as the low-molecular, polyhydric alcohols mentioned above as the structural components for polyester polyols. The corresponding polymers of ε-caprolactone are preferred.

Particularly preferred are polyester polyols containing isophthalic acid and/or terephthalic acid and other dicarboxylic acids as well as 2,2-dimethyl-1,3-propanediol and/or ethyleneglycol and/or butanediol and/or hexanediol, where appropriate, as structural components.

Most particularly preferred are polyester polyols containing isophthalic acid, adipic acid and 2,2-dimethyl-1,3-propanediol as structural components.

Polycarbonates having hydroxyl groups are also possible polyhydroxyl components A), for instance of the type which may be prepared by reaction of diols such as 1,4-butanediol and/or 1,6-hexanediol with diarylcarbonates such as diphenylcarbonate, dialkylcarbonates such as dimethylcarbonate or phosgene. The resistance to hydrolysis of the polyurethane or polyurethane-urea dispersion adhesives may be improved by at least in part using polycarbonates having hydroxyl groups.

Suitable polyether polyols are, for instance, the polyaddition products of the styrene oxides, ethylene oxide, propylene oxide, tetrahydrofurane, butylene oxide, epichlorohydrin as well as their coaddition and grafting products as well as the polyether polyols obtained by condensation of polyhydric alcohols or mixtures thereof and by alcoxylation of polyhydric alcohols, amines and aminoalcohols. The homo-, co- and graft polymers of propylene oxide and of ethylene oxide which are available by addition of the mentioned epoxides to low-molecular di- or triols, mentioned above as the structural components for polyether polyols, or to higher functional low-molecular polyols such as pentaerythrite or sugars or to water are suitable polyether polyols as the structural components A).

Particularly preferred di- or higher functional polyols A) are polyester polyols, polylactones and polycarbonates.

Most particularly preferred di- or higher functional polyols A) are polyester polyols.

Other suitable components A) are low-molecular diols, triols and/or tetraols such as ethanediol, di-, tri-, tetraethyleneglycol, 1,2-propanediol, di-, tri-, tetrapropyleneglycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylolcyclohexane, octane diol-1,8, decanediol-1,10, dodecanediol-1,12, neopentylglycol, 1,4-cyclohexanediol, 1,4-cyclohexane-dimethanol, 1,4-, 1,3-, 1,2-dihydroxybenzene or 2,2-bis-(4-hydroxyphenyl)-propane (bisphenol A), TCD-diol, trimethylolpropane, glycerine, pentaerythrite, dipenthaerytrite or mixtures thereof, if appropriate, using further diols or triols not mentioned.

Reaction products of the mentioned polyols, particularly of the low-molecular polyols, with ethylene and/or propylene oxide also may be employed as the polyols.

The low-molecular components A) have a molecular weight of 62 to 400 g/Mol and are preferably employed in combination with the polyester polyols, polylactones, polyethers and/or polycarbonates mentioned above.

The polyol component A) is contained in the polyurethane according to the invention at 20 to 95, preferably at 30 to 90 and more preferably at 65 to 88% by weight.

As components B) any organic compounds are suited which contain at least two free isocyanate groups per molecule. Preferably, diisocyanates $Y(NCO)_2$ are used, wherein Y represents a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms, or a divalent araliphatic hydrocarbon radical having 7 to 15 carbon atoms. Examples of such preferably used diisocyanates are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (=IPDI, isophorone diisocyanate), 4,4'-diisocyanato-dicyclohexyl-methane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenyl-methane, 2,2'- and 2,4'-diisocyanatodiphenylmethane, tetramethylxylylene diisocyanate, p-xylylene diisocyanate, p-isopropylidene diisocyanate as well as mixtures consisting of these compounds.

Of course, it is also possible to use in part the higher functional polyisocyanates known per se in polyurethane chemistry or modified polyisocyanates known per se such as those having carbodiimide groups, allophanate groups, isocyanurate groups, urethane groups and/or biuret groups.

In addition to these simple diisocyanates, those polyisocyanate are also suited which contain heteroatoms in the radical linking the isocyanate groups and/or have a functionality of more than 2 isocyanate groups per molecule. The first ones, for instance, are polyisocyanates prepared by the modification of simple aliphatic, cycloaliphatic, araliphatic and/or aromatic diisocyanates with a uretdione, isocyanurate, urethane, allophanate, biuret, carbodiimide, imino-oxadiazin dione and/or oxadiazin trione structure. One example of a non modified polyisocyanate with more than 2 isocyanate groups per molecule is 4-isocyanatomethyl-1,8-octanediisocyanate (nonanetriisocyanate), for example.

Preferred diisocyanates B) are aliphatic and araliphatic diisocyanates such as hexamethylene diisocyanate, 1,4-diisocyanatocyclohexane, 1-isocyanato-3,3,5-trimethyl-5-isocyanatomethyl-cyclohexane, 4,4'-diisocyanato-dicyclohexyl-methane, 4,4'-diisocyanato-dicyclohexylpropane-(2,2), as well as mixtures consisting of these compounds which may optionally contain proportions of 2,4-siisocyanatotoluene and/or 2,6-diisocyanatotoluene.

Particularly preferred components B) are hexamethylene diisocyanate, 1-isocyanato-3,3,5-trimethyl-5-isocyanatomethyl-cyclohexane, 4,4'-diisocyanato-dicyclohexyl-methane, 2,4-diisocyanatotoluene and 2,6-diisocyanatotoluene as well as mixtures thereof.

Most particularly preferred as the component B) is 1-isocyanato-3,3,5-trimethyl-5-isocyanatomethyl-cyclohexane.

The component B) is contained in the polyurethane according to the invention in quantities of 5 to 60, preferably of 6 to 45, and more preferably in quantities of 7 to 25% by weight.

Suitable components C) which contain sulphonate or carboxylate groups are, for instance, diamino compounds or dihydroxy compounds which additionally carry sulphonate and/or carboxylate groups such as the sodium, lithium, potassium, tert.-amine salts of N-(2-aminoethyl)-2-aminoethane sulphonic acid, N-(3-aminopropyl)-2-aminoethane sulphonic acid, N-(3-aminoproyl)-3-aminopropane sulphonic acid, N-(2-aminoethyl)-3-aminopropane sulphonic acid, the analogous carboxyl acids, dimethylol propionic acid, dimethylol butyric acid, the reaction products in the sense of a Michael condensation of 1 Mol diamine such as 1,2-ethane diamine or isophorone diamine with 2 mol acrylic acid or maleic acid.

Preferred components C) are N-(2-aminoethyl)-2-aminoethane sulphonate or dimethylol propionate.

Preferably, the acids are employed directly in their salt form as sulphonate or carboxylate. However, it is also possible to add the neutralizing agents partly or completely during or after the manufacture of the polyurethanes only.

Tert.-amines particularly suitable and preferred for the salt formation are triethylamine, dimethylcyclohexylamine, ethyldiisopropylamine, for example.

Other amines such as ammonia, diethanolamine, triethanolamine, dimethylethanolamine, methydiethanolamine, aminomethylpropanol and also mixtures of the aforementioned and also further amines may also be employed for the salt formation. It is expedient for these amines to be added only after substantial reaction of the isocyanate groups.

It is also possible to employ other neutralizing agents such as sodium, potassium, lithium, calcium hydroxide for neutralizing purposes.

The component C) is contained in the polyurethane according to the invention at 0.3 to 10, preferably at 0.5 to 5 and more preferably at 0.7 to 3.75% by weight.

Suitable components D) are mono-, di-, trifunctional amines and/or mono-, di-, trifunctional hydroxyamines such as aliphatic and/or alicyclic primary and/or secondary monoamines such as ethylamine, diethylamine, the isomer propyl and butylamines, higher linearly aliphatic monoamines and cycloaliphatic monoamines such as cyclohexylamine. Further examples are aminoalcohols, i.e. compounds which contain amino and hydroxyl groups in one molecule such as ethanolamine, N-methylethanolamine, diethanolamine, diisopropanolamine, 1,3-diamino-2-propanol, N-(2-hydroxyethyl)-ethylenediamine, N,N-bis(2-hydroxyethyl)-ethylenediamine and 2-propanolamine. Further examples are diamines and triamines such as 1,2-ethanediamine, 1,6-hexamethylenediamine, 1-amino-3,3,5-trimethyl-5-aminomethyl-cyclohexane (isophoronediamine), piperazine, 1,4-diaminocyclohexane, bis-(4-aminocyclohexyl)-methane and diethylenetriamine. Furthermore, adipic acid dihydrazide, hydrazine or hydrazine hydrate is conceivable. Of course, mixtures of a plurality of the aforementioned compounds D), optionally also together with ones not mentioned, may be employed.

Preferred components D) are 1,2-ethanediamine, 1-amino-3,3,5-trimethyl-5-aminomethyl-cyclohexane, diethylenetriamine, diethanolamine, ethanolamine, N-(2-hydroxyethyl)-ethylenediamine and N,N-bis(2-hydroxyethyl)-ethylenediamine Particularly preferred components D) are diethanolamine and N-(2-hydroxyethyl)-ethylenediamine; diethanolamine is more particularly preferred.

The components D) as chain extension agents preferably serve to build up higher molecular weights or to limit molecular weights as monofunctional compounds and/or to additionally insert further reactive groups such as free hydroxyl groups as further cross linking positions, where appropriate.

The component D) is contained in the polyurethane according to the invention in quantities of 0 to 10, preferably of 0 to 5 and more preferably in quantities of 0.2 to 3% by weight.

Components E) which are optionally also used may for example be aliphatic, cycloaliphatic or aromatic monoalcohols with 2 to 22 C atoms such as ethanol, butanol, hexanol, cyclohexanol, isobutanol, benzyl alcohol, stearyl alcohol, 2-ethylethanol, cyclohexanol; hydrophilizingly acting, mono- or difunctional polyethers on the basis of ethylene oxide polymers or ethylene oxide/propylene oxide copolymers started on alcohols or amines such as polyether LB 25

(Bayer Material Science AG; Germany) or MPEG 750: methoxypolyethylene glycol, molecular weight 750 g/Mol (e.g., Pluriol® 750, BASF AG, Germany); blocking agents common for isocyanate groups and re-separable at elevated temperatures such as butanonoxime, dimethylpyrazole, caprolactam, malonic acid ester, triazole, dimethyltriazole, tert.-butylbenzylamine, cyclopentanone carboxyethylester; unsaturated compounds containing groups accessible for polymerisation reactions such as hydroxyethyl acrylate, hydroxyethyl methacrylate, hydroxybutyl acrylate, hydroxybutyl methacrylate, hydroxypropyl acrylate, hydroxypropyl methacrylate, pentaerythrite trisacrylate, hydroxyfunctional reaction products of monoepoxides, bisepoxides and/or polyepoxides with acrylic acid or methacrylic acid.

The components E) may be contained in the polyurethane according to the invention in quantities of 0 to 20, preferably of 0 to 10% by weight.

The use of component E) may for example lead to polyurethane dispersions according to the invention which in addition to the reactive carboxyl groups contain further reactive groups enabling, for example, the application of various cross-linking mechanisms (Dual Cure) in order to obtain special properties such as a two-stage curing, optionally temporally offset, or a particularly high cross-linking density.

The polyurethane dispersions according to the invention have a solid matter content of 15 to 70% by weight, more preferably of 25 to 60% by weight and most preferably of 30 to 50% by weight. The pH-value is in the range from 4 to 11, preferably from 6 to 10.

In a particularly preferred embodiment of the present invention, the polyurethane or polyurethane-polyurea polymer contains a polyester diol which contains isophthalic acid, adipic acid and 2,2-dimethyl-1,3-propanediol as structural components, 1-isocyanato-3,3,5-trimethyl-5-isocyanatomethyl-cyclohexane, the sodium salt of N-(2-aminoethyl)-2-aminoethane sulphonic acid and diethanolamines as structural components.

The manufacture of the aqueous polyurethane or polyurethane-urea dispersions according to the invention may be performed such that the components A), B), optionally C), and optionally E) are transformed in a single- or multi-stage reaction into an isocyanate-functional prepolymer which subsequently, in a single- or multi-stage reaction, is transformed optionally with component C) and optionally D), and then is dispersed in or with water, wherein the solvent used, if any, may be removed partly or completely by distillation during or after the dispersion.

The manufacture of the aqueous polyurethane or polyurethane-urea dispersions according to the invention may be performed in one or more stages in homogeneous or, in the case of a multi-stage reaction, partly in disperse phase. After the completely or partly performed polyaddition a dispersing, emulsifying or dissolving step is carried out. Subsequently, a further polyaddition or modification is optionally carried out in disperse phase. All methods known in the prior art such as emulsifier-shear force, acetone, prepolymer-mixing, melt-emulsifying, ketimine and solid-matter spontaneous dispersing methods or derivatives thereof may be used for the manufacture. A summary of these methods is to be found in Methoden der organischen Chemie (Methods of Organic Chemistry) (Houben-Wyl, extension and continuation volumes to the $4^{th}$ edition, volume E20, H. Bartl and J. Falbe, Stuttgart, New York, Thieme 1987, pp. 1671-1682). The melt-emulsifying, prepolymer-mixing and acetone methods are preferred. The acetone method is particularly preferred.

In principle, it is possible to weigh in all hydroxyl-functional components, then to add all isocyanate-functional components and to transform this into isocyanate-functional polyurethane which then will be reacted with the amino-functional components. A reverse manufacture by filling in the isocyanate component first, adding the hydroxyl-functional components, transforming into polyurethane and then reacting with the amino-functional components to form the final product is also possible.

Conventionally, for the manufacture of a polyurethane polymer in the reactor the hydroxyl-functional components A), optionally C), and optionally E) are filled in first, optionally diluted with a solvent which is mixable with water but inert to isocyanate groups, and then homogenized. Subsequently, at room temperature up to 120° C., the component B) is added and isocyanate-functional polyurethane is manufactured. This reaction may be carried out in a single stage or in a plurality of stages. A multi-stage reaction, for instance, may occur such that a component C) and/or E) is filled in first and after the reaction with the isocyanate-functional component B) a component A) is added which then may react with part of the still existing isocyanate groups.

Suitable solvents are for example acetone, methylisobutylketone, butanone, tetrahydrofurane, dioxane, acetonitrile, dipropylene glycol dimethyl ether and 1-methyl-2-pyrrolidone, which may be added not only at the beginning of the manufacture but optionally also in part later. Acetone and butanone are preferred. It is possible to perform the reaction at normal pressure or elevated pressure.

For the manufacture of the prepolymer the used quantities of the hydroxyl- and, where appropriate, amino-functional components are selected such as to result in an isocyanate index of 1.05 to 2.5, preferably of 1.15 to 1.95, more preferably of 1.3 to 1.7.

The further transformation (?) Conversion, the so-called chain extension, of the isocyanate-functional prepolymer with further hydroxyl- and/or amino-functional, preferably only amino-functional components D) and optionally C) is effected such that a transformation (Conversion?) degree of 25 to 150, preferably of 40 to 85% of hydroxyl and/or amino groups, based on 100% of isocyanate groups, is selected.

With transformation (conversion) degrees of more than 100%, which are possible but less preferred, it is advisable to react all monofunctional components in the sense of the isocyanate addition reaction with the prepolymer first and subsequently to employ the di- or higher functional chain extension components, in order to obtain as complete an integration of the chain extension molecules as possible.

The conversion degree is conventionally monitored by tracking the NCO content of the reaction mixture. Additionally, spectroscopic measurements, e.g. infrared or near-infrared spectra, determinations of the refractive index as well as chemical analyses such as titrations of samples taken may be carried out.

For the acceleration of the isocyanate addition reaction, conventional catalysts such as are known by those skilled in the art for the acceleration of the NCO—OH reaction may be employed. Examples are triethylamine, 1,4-diazabicyclo-[2, 2,2]-octane, dibutyl tin oxide, tin dioctoate or dibutyl tin dilaurate, tin-bis-(2-ethylhexanoate) or other metallo-organic compounds.

The chain extension of the isocyanate-functional prepolymer with the component D) and optionally C) may be performed before the dispersing step, during the dispersing or after the dispersing. The chain extension is preferably performed before the dispersing. If component C) is employed as a chain extension component then a chain extension with this component before the dispersing step is mandatory.

The chain extension is conventionally performed at temperatures of 10 to 100° C., preferably of 25 to 60° C.

The term chain extension in the sense of the present invention also involves the reactions of monofunctional components D), if any, which due to their monofunctionality act as chain terminators and thus do not lead to an increase but to a limitation of the molecular weight.

The components of the chain extension may be added to the reaction mixture diluted with organic solvents and/or with water. The addition may be effected successively in any order or simultaneously by adding a mixture.

For the purposes of manufacturing the polyurethane dispersion, the prepolymer is charged into the dispersing water or conversely the dispersing water is stirred into the prepolymers, with strong shearing action such as strong agitation. Subsequently, the chain extension may then be carried out if it has not already taken place in the homogeneous phase.

During and/or after dispersing, the organic solvent used, if any, such as acetone is distilled off The following is a preferred manufacturing method:

Component A), optionally component C), and optionally component E), and optionally solvents, are filled in first and heated up to 20 to 100° C. While stirring, component B) is added as fast as possible. Utilizing the exothermy, the reaction mixture is stirred at 40 to 150° C. until the theoretical isocyanate content is achieved or slightly fallen below. While doing so, a catalyst may optionally be added. Subsequently, the mixture is diluted to a solid matter content of 25 to 95, preferably of 35 to 80% by weight by adding solvent; and then the chain extension is performed by adding the component E) diluted with water and/or solvent, optionally together with component C), at 30 to 120° C. After a reaction period of 2 to 60 minutes, it is dispersed by adding distilled water or by transferring into distilled water filled in first and the solvent used is partly or completely distilled off during or after the dispersing step.

The dispersions according to the invention may be employed alone or with the binding agents, additives and auxiliaries known in the art of coating and adhesive technology, particularly emulsifiers and light stabilizers such as UV absorbers and sterically hindered amines (HALS), and also antioxidants, fillers and auxiliary agents, e.g. anti-settling agents, antifoaming and/or surface-active agents, levelling agents, reactive diluents, softening agents, neutralizing agents, catalysts, auxiliary solvents and/or thickeners and additives such as pigments, colours or matting agents. Tackifying agents ("tackifiers") may also be added.

The additives may be added to the products according to the invention immediately before processing. However, it is also possible to add at least a part of the additives before or during the dispersing of the binding agent.

The selection and the amount of these substances that may be added to the individual components and/or the entire mixture are generally known to those skilled in the art and may be tailored to the specific application case or determined by simple preliminary tests without unreasonably great expense.

Preferably, the acrylate polymer has a weight average molecular weight Mw in the range from $10^3$ to $10^6$ g/mol, more preferably in the range from $10^4$ to $5*10^5$ g/mol, most preferably in the range from $2*10^4$ to $2*10^5$ g/mol.

Preferably, the acrylate polymer in the dispersion has an average particle diameter in the range from 40 to 200 nm, most preferably in the range from 80 to 160 nm. The particle diameter is determined by laser correlation spectroscopy (apparatus: Malvern Zetasizer 1000, Malvern Instruments LTD), and the Z-averages are given.

The solid matter content of the acrylate polymer dispersions according to the invention is between 25 and 65% by weight, preferably between 30 and 55% by weight, most preferably between 35 and 55% by weight. The solid matter content of a dispersion is generally determined from the ratio of water to organic starting materials.

The used polyacrylate dispersions according to the invention contain:

a) 40 to 70% by weight of styrene and/or other vinyl aromatic compounds, b) 4 to 40% by weight of an acrylic ester, c) 2 to 5% by weight of an acid-functional, olefinically unsaturated monomer and d) 10 to 40% by weight of a methacrylic ester.

Preferably, the weight proportions of the components a), b), c) and d) make up 100%.

The viscosity of the polymer dispersions according to the invention is between 5 and 300 mPa·s, preferably between 10 and 150 mPa·s, most preferably between 15 and 100 mPa·s. The determination of viscosity may be performed with a VT-500 rotation viscosimeter of Fa. Haake according to DIN 53019.

The pH of the dispersion can be varied by adding defined quantities of a base and may be between pH 3 and 12, a pH of 6 to 9 being preferred. Most commonly, the polymerization is effected in the acid pH-range; and the neutralization is effected after the polymerization is complete. However, it is also possible to add part of the base already in the course of the polymerization in order to prevent an agglomeration, where appropriate. As bases the inorganic or organic bases known to those skilled in the art may be used; these include aqueous solutions of alkali hydroxides, ammonium hydroxide, organic amines such as triethylamine or ethyl diisopropylamine. Alkali hydroxides and ammonium hydroxide are preferred.

Suitable vinyl aromatic compounds a) are, for instance, vinyltoluene, o- and p-methylstyrene, butylstyrene, 4-n-butylstyrene, 4-n-decylstyrene, halogenated styrenes such as monochlorostyrenes, dichlorostyrenes, tribromostyrenes or tetrabromostyrene. Styrene is preferred.

Suitable acrylic esters b) particularly comprise methylacrylate, ethylacrylate, propylacrylate, isopropylacrylate, n-butylacrylate, sec-butylacrylate, tert.-butylacrylate, pentylacrylate, hexylacrylate, heptylacrylate, octylacrylate, 2-octylacrylate, ethylhexylacrylate, nonylacrylate, 2-methyl-octylacrylate, 2-tert.-butylheptylacrylate, 3-iso-propylheptylacrylate, decylacrylate, undecylacrylate, 5-methylundecylacrylate, dodecylacrylate, 2-methyldodecylacrylate, tridecylacrylate, 5-methyltridecylacrylate, tetradecylacrylate, pentadecylacrylate, hexadecylacrylate, 2-methylhexade-cylacrylate, heptadecylacrylate, 5-isopropylheptadecylacrylate, 5-ethyloctadecylacrylate, octadecylacrylate, nonadecylacrylate, eicosylacrylate, cycloalkylacrylates such as cyclopentylacrylate, cyclohexylacrylate, 3-vinyl-2-butylcyclohexylacrylate, cycloheptylacrylate, cyclooctylacrylate, bornylacrylate, tetrahydrofurfurylacrylate and isobornylacrylate. Ethylacrylate, n-butylacrylate, ethylhexylacrylate, cyclohexylacrylate are preferred; ethylacrylate, n-butylacrylat or ethylhexylacrylate are particularly preferred.

Suitable olefinically unsaturated, acid-functional monomers c) are sulphone, phosphate or carboxyl acid functional monomers, unsaturated carboxyl acid functional monomers such as acrylic acid, methacrylic acid, β-carboxyethylacrylate, crotonic acid, fumaric acid, maleic acid anhydride, itaconic acid or monoalkyl ester of dibasic acids or anhydrides such as maleic acid monoalkyl ester are preferred. Furthermore, unsaturated, radically polymerizable compounds with phosphate or phosphonate groups or sulphonic acid or sulphonate groups, such as are described in WO-A 00/39181 (p. 8, 1. 13-p. 9, 1. 19), are also suited as compounds of component d). Acrylic acid or methacrylic acid is particularly preferred; acrylic acid is most preferred.

Suitable methacrylic esters d) particularly comprise methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert.-butylheptyl methacrylate, 3-iso-propylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-iso-propylheptadecylme-thacrylate, 5-ethyloctadecyl methacrylate, octadecyl methacrylate, nonadecyl methacrylate, eicosyl methacrylate, cycloalkyl methacrylates such as cyclopentyl methacrylate, cyclohexyl methacrylate, 3-vinyl-2-butylcyclohexyl methacrylate, cycloheptyl methacrylate, cyclooctyl methacrylate, bornyl methacrylate, tetrahydrofurfuryl methacrylate or isobornyl methacrylate. Furthermore, the derivatives of methacrylic acid also may be employed in the form of the corresponding nitriles or amides such as methacrylnitrile or methacrylamide. Additionally there is the possibility to use other functional monomers depending on the desired application, such as diacetone methacrylamide or acetoacetoxyethyl methacrylate. Methyl methacrylate, ethyl methacrylate, butyl methacrylate, tert-butyl methacrylate are preferred; methyl methacrylate, tert-butyl methacrylate or butyl methacrylate are particularly preferred.

The manufacture of the polyacrylate dispersions according to the invention may be performed in a manner known per se, such as by means of emulsion polymerization. Conveniently, it is performed by an semi-continuous method wherein water, emulsifier and a small quantity of an initiator, where appropriate, are filled in first. In doing so, the filled in material preferably contains 40 to 80 parts by weight of water, based on the total amount of water, 0.1 to 1.5 parts by weight of emulsifier, based on the solid matter, and 0.01 to 0.3% by weight of an initiator, based on the solid matter, where appropriate, wherein the given parts by weight add to 100.00 parts by weight. Subsequently, a small quantity of the monomers, preferably 5 to 15% by weight, is added, and the initiator, preferably 0.01 to 0.3% by weight, is optionally added at the same time, to form an internal seed on which the further polymerization steps take place.

Then the monomers in the aforementioned proportions are continuously added to this internal seed and polymerized up to a conversion of at least 95.0% by weight, preferably at least 98.0% by weight, more preferably at least 99.0% by weight, most preferably at least 99.5% by weight, based on their respective total weights.

Normally, the emulsion is polymerized at a temperature of 30 to 100° C., preferably of 50 to 90° C.

The dispersions containing an acrylate polymer are stabilized by means of ionic and/or non-ionic emulsifiers and/or protective colloids, inter alia. As the ionogenic emulsifiers, primarily anionic emulsifiers are conceivable. These may be the alkali or ammonium salts of alkyl, aryl, or alkylaryl sulphonates, phosphates, phosphonates or compounds with other anionic end groups where oligo- or polyethylene-oxide units also may be located between the hydrocarbon radical and the anionic group. Typical examples are sodium laurylsulphate, sodium lauryldiglykolsulphate, sodium decylglykolethersulphate, sodium octylphenolglykolethersulphate or sodium dodecylbenolsulphate.

As the non-ionic emulsifiers, alkylpolyglycol ethers such as ethoxylation products of lauryl, oleyl or stearyl alcohol or of mixtures such as coconut oil alcohol are conventionally used. Alkylphenolpolyglycol ethers such as ethoxylation products of octyl or nonylphenol, diisopropylphenol, triisopropylphenol, di- or tri-tert-butylphenol are also suited. In addition to the mentioned compound classes, ethoxylation products of propylene oxide may also be employed.

As suitable protective colloids natural substances such as gum arabic, starch, alginates or modified natural substances such as methyl, ethyl, hydroxyalkyl or carboxymethyl cellulose or synthetic substances such as polyvinyl alcohol or modified polyvinyl alcohols or polyvinyl pyrrolidones are used.

The emulsifiers also may be modified by a corresponding functionalization such that they radicalically copolymerize with the monomers (surfmer).

Furthermore, it is also possible to use mixtures of the aforementioned emulsifiers.

An alkyl phosphate ester such as a phosphate ester of non-ionic and polyoxyethylene adducts (available under the name Dextrol OC® from Hercules firm, USA) is preferably employed as emulsifier. The total amount of emulsifier, based on the solid matter, is 0.3 to 1.5% by weight, preferably 0.3 to 1.0% by weight.

The emulsion is normally polymerized at 30 to 100° C., preferably 50 to 90° C. The polymerization medium may consist of water alone or and of mixtures of water and liquids mixable therewith such as methanol. It is preferred to use water only. Emulsion polymerization may be performed both as a batch process and in the form of an semi-continuous method including stage or gradient operation; the semi-continuous method is preferred. With the semi-continuous method polymerization is effected at a comparably small monomer pad wherein one or more monomers in pure or emulsified form and the mostly water-soluble auxiliary agents are added continuously, in stages or in the form of a gradient over various spatially separated inflow. The particle size is set by means of the formation in situ of an internal seed, the particle size of the seed being adjusted by the ratio of emulsifier to monomer. It is also possible to control the particle size by filling in an external seed with defined particle size first. The way the initiator is added to the polymerization vessel in the course of the radicalic aqueous emulsion polymerization is known to those skilled in the art. It may be filled in completely first or employed continuously or in stages in accordance with its consumption in the course of the radicalic aqueous emulsion polymerization. In particular, this depends on the chemical nature of the initiator system as well as on the polymerization temperature. Preferably one part is filled in first and the remainder is supplied to the polymerization zone in accordance with the consumption.

The adhesive compositions according to the invention may be manufactured by mixing the acrylate polymer dispersion according to the invention with the polyurethane or polyurethane-polyurea-polymer dispersion according to the invention in any sequence.

The adhesive compositions according to the invention may be employed alone or with the binding agents, additives and admixtures known in the art of coating and adhesive technology, particularly emulsifiers and light stabilizers such as UV absorbers and sterically hindered amines (HALS), furthermore antioxidants, fillers and auxiliary agents, e.g. antisettling agents, antifoaming and/or surface-active agents, levelling agents, reactive diluents, softening agents, neutralizing agents, catalysts, auxiliary solvents and/or thickeners and additives such as pigments, colours or matting agents. Tackifying resins ("tackifiers") may also be added. Tackifying resins are understood to mean all natural and synthetic resins or polymers which as additives increase the tackiness, i.e. the property of firm adhesion to surfaces after short, light contact pressure. To achieve this, adhesive resins have to have a sufficient compatibility with the polymers, inter alia. There is no need for the tackifiers themselves to have tackiness. Commonly used tackifiers are terpene oligomers, aliphatic petrochemical resins or colophony resins, among others.

The adhesive compositions according to the invention are suited for the bonding of any substrates such as paper, cardboard, wood, textiles, metal, leather, glass or mineral materials. Additionally, the adhesive compositions according to the invention are suited for the adhesive bonding of rubber materials such as natural and synthetic rubbers, various synthetic materials such as polyurethanes, polyvinyl acetate or polyvinylchloride.

The adhesive compositions according to the invention after heat activation at temperatures higher than 50° C. have a pressure sensitive adhesiveness that is particularly advantageous for the use as "linerless-label adhesive layer". Moreover, the adhesive layers made from the adhesive compositions according to the invention up to 50° C. do not exhibit tackiness or a blocking tendency, not even at high winding pressures. In this way, labels free of release paper or release film, particularly in the form of large rolls for industrial applications, are possible. Additionally, the adhesive compositions according to the invention exhibit particularly high adhesive value; and the tackiness is to a large extent independent of the layer thickness of the adhesive layer. That's why the adhesive compositions according to the invention preferably are used for the manufacture of labels without a release layer (linerless labels).

The adhesive layer containing the adhesive compositions according to the invention at temperatures≤50° C. is non-blocking. A polymer is non-blocking when it doesn't flow onto a substrate surface even under pressure and thus can't wet it. Non-blocking properties may be detected by determining the tackiness (tack). With a non-blocking polymer layer, the tack is ≤0.5 N/mm².

The adhesive layers made of the adhesive compositions according to the invention are preferably transparent and substantially colourless.

The present invention also relates to planar formations containing a heat-activated adhesive layer as well as a substrate, the adhesive layer containing the adhesive composition according to the invention.

Suitable substrates are paper, aluminium or plastics material sheets such as polyester, polypropylene, polyethylene, polyacetate, polylactide or cellophane sheets. The substrate may be printed on one side or both sides. Preferably, the planar formations are labels, more preferably labels without a release paper or film ("linerless labels"). The adhesive composition also may be used as a so-called heat-sealing lacquer.

The present invention also relates to a method for the manufacture of the planar formations according to the invention, the adhesive layer being applied to the substrate with a layer thickness of 10 to 50 µm, preferably of 20 to 30 µm. The application of the adhesive may be effected by spraying, with plain rollers, gravure rollers, screen rollers, in serigraphy, also with rotary serigraphy, and with doctor-blade spreader, chambered doctor blade or rotary doctor blade, for example. The adhesive may also be applied by casting onto the film sheets, allowing high coating rates to be achieved.

Another subject-matter is a method for the application of the planar formation according to the invention onto an object, the planar formation being heated to a temperature≥50° C. first and subsequently being applied to the object.

Moreover, it is possible for the object, preferably its surface, to be heated to a temperature≥50° C. first and for the planar formation to be applied subsequently.

It is also possible for the planar formation and the object, preferably its surface, to be heated separately from each other to a temperature≥50° C. first and for the planar formation to be applied to the object subsequently.

These objects may be packing receptacles such as cardboard boxes, cans, bottles or plastic bags. Preferred objects are bottles or plastic bags; glass bottles are particularly preferred.

EXAMPLES

Methods

Determination of the Glass Transition Temperature

The glass transition temperature Tg is determined by DSC (Differential Scanning Calorimetry) according to DIN 65467. With this measuring principle, the test substance and an inert reference substance are heated in a twin measuring cell such that both always have the same temperature. Physical or chemical changes in the test substance change the sample morphology which typically is related to a temperature difference from the reference. This temperature difference is compensated by additional electrical power that is measured and is a measure for the heat flow. During the entire measurement, test substance and reference are subjected to the same temperature/time program.

A DSC-7 calorimeter from Perkin-Elmer is the measuring instrument. The calibration of the temperature is effected by means of the melt-onset temperatures of indium and lead, the calibration of the heat tone by means of the melt surface integral of indium.

About 10 mg of the test substance are filled into a DSC crucible and compacted with a punch therein; the crucible is tightly closed with a lid.

Heating is carried out three times consecutively in the temperature range from −100° C. up to the end temperatures of +80° C. in the first heating and +150° C. in the second and third heatings. The heating rate is 20 K/min, the cooling rate 320 K/min. Cell flushing gas is helium (30 ml/min); cell cooling is carried out with liquid nitrogen.

The glass transition temperature is evaluated according to DIN 51005 by placing tangents to the DSC measurement curve and is the temperature at half the height of the glass transition after the third heating.

Manufacture of the Adhesive Films

The mixtures of the dispersions are poured out into a Teflon tray such that adhesive films with a thickness of about 2 mm result (assumption: density of the dispersions=1 g/cm³). The dispersions poured out are dried at 23° C./50% relative moisture for 1 week. The adhesive films then are used to determine storage and loss modulus data.

Determination of Storage and Loss Modulus

Storage and loss modulus are determined by means of oscillating rheometry in accordance with ASTM D 4440-08 with a Rheometrics ARES rotational rheometer. With this measuring principle the upper and the lower measuring plate are brought together beforehand in order to calibrate the position of the measuring plates at a gap distance equal to zero. A circular sample, with the same diameter as the measuring plate diameter is punched out of the dried dispersion. The sample is applied between the measuring plates; the measuring plates are brought together up to the sample height and tempered for 10 minutes. Subsequently, the plate distance is reduced such that a normal force of 10 N maximum and 2 N minimum results. Material possibly protruding beyond the measuring plates is removed with a blade. The oscillating measurement is initiated at 100 rad/s. Subsequently, the measurement frequency is reduced in steps of 3 measurements every ten days up to 0.01 rad/s. The deformation of the oscillation has an edge amplitude of 0.6% to 2%. For the measurement at a constant measurement temperature, the device's software calculates the storage and the loss modulus for each measurement frequency from the torque, the phase difference between tension and deformation and the plate geometry.

Determination of the Particle Diameter

The average particle size (APS) was determined by laser correlation spectroscopy (apparatus: Malvern Zetasizer 1000, Malvern Instruments LTD), and the Z-averages are given.

Determination of the Solid Matter Content (SMC)

The solid matter content was determined in accordance with DIN-EN ISO 3251.

The weight average molecular weights Mw were determined by GPC (Gel Permeation Chromatography):

Apparatus: Hewlett Packard 1100 series II with refraction index detector

Column heating installation: VDS-Optilab Jetstream 2 Plus

Columns:
1. PSS HEMA 40; 50×7.8 mm; Polymer Standard Services
2. Suprema 1000; 300×7.8 mm; Polymer Standard Services
3. PSS HEMA 300; 300×7.8 mm; Polymer Standard Services
4. PSS HEMA 40; 300×7.8 mm; Polymer Standard Services
5. PSS HEMA 40; 300×7.8 mm; Polymer Standard Services Mobile phase: dimethylacetamide Conditions: flow rate 0.6 ml/min; pressure 110 bar; temperature 30° C.

Standard: PSS Polymer—Standard—Service GmbH, Mainz; Germany Manufacture of the acrylate polymers Chemicals:
Acrylic acid (ACS), CAS 79-10-7, Aldrich, DE
Methyl methacrylate (MMA), CAS 80-62-6, Aldrich, DE
Styrene (S), CAS 100-42-5, Aldrich, DE
N-butylacrylate (BA), CAS 141-32-2, Aldrich, DDE
Butylmethacrylate (BMA), CAS 97-88-1, Aldrich, DE
Ammonium persulphate (APS), CAS 7727-54-0, Aldrich, DE
Emulsifier Tannemul® 951 (E951), CAS 68610-22-0, Tanatex, DE
N-dodecylmercaptan, CAS 112-55-0, Aldrich, DE General Synthesis Specification:

In a 3 l glass reactor with controlled heating and cooling and an agitator motor, in a nitrogen atmosphere, water is filled in first along with the corresponding emulsifier quantity E1. Subsequently, the solution is heated to the given temperature. After reaching the polymerization temperature, the monomer mixture M1 and the initiator mixture W1 for the preparation of the internal seed are added by means of a metering pump within 30 min. Thereafter, the monomer mixture M2 and the aqueous solution W2 are added at the corresponding temperature within 240 min. Immediately after the additions M2 and W2 are complete, the aqueous solution W3 for the post-activation is added within 60 min.; the dispersion continues to be agitated for a period of 60 min. and subsequently is cooled down. To set the pH to 7, the corresponding quantity of ammoniacal solution (W4) is slowly added in drops, and the finished dispersion is discharged through a 125 mm filter.

TABLE 1

Recipes for the manufacture of the polyacrylate dispersions

| | | Example | | | | |
|---|---|---|---|---|---|---|
| | | 1 | 2 | 3 | 4 | 5 |
| First fill (E1) | Emulsifier Tannemul 951 (21.5%) | 0 | 28 | 28 | 28 | 28 |
| | Emulsogen APS 100 | 10 | 0 | 0 | 0 | 0 |
| | Dextrol OC 40 | 5.5 | 0 | 0 | 0 | 0 |
| | E-water | 700 | 678 | 678 | 678 | 678 |
| | Ammonia | 0.65 | 0 | 0 | 0 | 0 |
| M1 | Methyl methacrylate | 8.5 | 8.5 | 8.5 | 8.5 | 8.5 |
| | Butyl acrylate | 15 | 20 | 20 | 20 | 20 |
| | Styrene | 30 | 60 | 60 | 60 | 60 |
| W1 | Ammonium persulphate | 0.5 | 0.5 | 0.5 | 0.5 | 0.5 |
| | E-water | 70 | 70 | 70 | 70 | 70 |
| M2 | Methyl methacrylate | 85 | 180 | 255 | 85 | 180 |
| | Butyl acrylate | 205 | 105 | 30 | 200 | 105 |
| | Butyl methacrylate | 55 | 55 | 55 | 55 | 55 |
| | Styrene | 625 | 595 | 595 | 595 | 595 |
| | 1.6-hexandiol dimethacrylate | 5 | 0 | 0 | 0 | 0 |
| | Acrylic acid | 29 | 29 | 29 | 29 | 29 |
| | n-dodecyl mercaptan | 0 | 5.4 | 5.4 | 21.85 | 21.9 |
| W2 | Ammonium persulphate | 4.3 | 4.25 | 4.25 | 4.3 | 4.3 |
| | Dextrol OC 40 | 5.5 | 0 | 0 | 0 | 0 |
| | Emulsifier 951 (21.5%) | 0 | 27.5 | 27.5 | 28.5 | 28.5 |
| | Ammonia (33%) | 1.5 | 0 | 0 | 0 | 0 |
| | E-water | 600 | 575 | 575 | 595 | 575 |
| W3 | Ammonium persulphate | 0.65 | 0.65 | 0.65 | 0.65 | 0.65 |
| | E-water | 70 | 70 | 70 | 70 | 70 |
| W4 | Ammonia (33%) | 11.5 | 7.63 | 7.63 | 9.28 | 7.8 |
| | E-water | 23.5 | 16.5 | 16.5 | 18 | 18.5 |
| Temperature/° C. | | 80 | 80 | 80 | 80 | 80 |
| Tg/° C. | | 65 | 77 | 91.5 | 52 | 70 |
| FSG/% | | 42 | 42 | 42 | 42 | 42 |
| pH | | 8 | 7 | 7 | 7 | 7 |
| MTG/nm | | 105 | 102 | 103 | 106 | 103 |
| Visco/mPa · s (D = 45.3 s$^{-1}$) | | 64 | 21 | 22 | 27 | 25 |

Manufacture of the polyurethane or polyurethane-polyurea dispersion:

Polyester diol: Baycoll® AD 2047, Bayer MaterialScience AG, Germany

Example 6

486.25 g of Baycoll® AD 2047 polyester were dehydrated for 1 hour at 100° C. and 15 mbar. At 60° C. 80.52 g of Desmodur® I (1-isocyanato-3,3,5-trimethyl-5-isocyanatomethyl-cyclohexane) were added. The mixture was agitated at 90° C. until an isocyanate content of 1.80 was reached. The reaction mixture was dissolved in 850 g acetone and in doing so cooled down to 50° C. A solution of 9.62 g sodium salt of N-(2-aminoethyl)-2-aminoethane sulphonic acid and 8.20 g diethanolamine in 170 g of water was added to the homogenous solution, with strong stirring. After 30 minutes of stirring, the mixture was dispersed at 50° C. within 20 minutes by adding 715 g of water. After the separation of the acetone by distillation, a solvent-free, aqueous polyurethane-polyurea dispersion with a solid matter content of 40.1% by weight, an average particle size of the disperse phase of 250 nm and a pH of 6.7 was obtained. The glass transition temperature Tg was +2° C., and the weight average molecular weight Mw was 35500 g/mol.

Adhesive Compositions/Blends

| | Parts by weight of the dispersions (example) | | | | | |
|---|---|---|---|---|---|---|
| Serial no. | No. 1 | No. 2 | No. 3 | No. 4 | No. 5 | No. 6 |
| 1 | 50 | — | — | — | — | 50 |
| 2 | 40 | — | — | — | — | 60 |
| 3 | 30 | — | — | — | — | 70 |
| 4 | — | 50 | — | — | — | 50 |
| 5 | — | 40 | — | — | — | 60 |
| 6 | — | 30 | — | — | — | 70 |
| 7 | — | — | 40 | — | — | 60 |
| 8 | — | — | 30 | — | — | 70 |
| 9 | — | — | 20 | — | — | 80 |
| 10 | — | — | 10 | — | — | 90 |
| 11 | — | — | — | 50 | 7- | 50 |
| 12 | — | — | — | 40 | — | 60 |
| 13 | — | — | — | 30 | — | 70 |
| 14 | — | — | — | — | 50 | 50 |
| 15 | — | — | — | — | 40 | 60 |
| 16 | — | — | — | — | 30 | 70 |

Test Results:

| | 50° C. | | 70° C. | | 90° C. | |
|---|---|---|---|---|---|---|
| Serial no. | G'/G" | G' @ 1 rad/s [Pa] | G'/G" | G' @ 1 rad/s [Pa] | G'/G" | G' @ 1 rad/s [Pa] |
| 1 | G' > G" | 6.5E7 | 40 rad/s | 4.3E5 | 10 rad/s | 9.6E4 |
| 2 | G' > G" | 3.4E7 | 50 rad/s | 3.1E5 | 20 rad/s | 1.5E5 |
| 3 | G' > G" | 1.5E7 | 30 rad/s | 1.9E5 | 40 rad/s | 3.6E4 |
| 4 | G' > G" | 1.3E7 | G' > G" | 9.9E6 | G" > G' | 9.8E4 |
| 5 | G' > G" | 5.8E6 | G' > G" | 2.5E6 | G" > G' | 1.1E5 |
| 6 | G' > G" | 1.7E6 | G' > G" | 4.5E5 | G" > G' | 6.2E4 |
| 7 | G' > G" | 2.3E7 | G' > G" | 1.4E7 | 5 rad/s | 1.2E6 |
| 8 | G' > G" | 1.2E7 | G' > G" | 4.2E6 | 15 rad/s | 2.9E5 |
| 9 | G' > G" | 1.8E6 | G' > G" | 4.8E5 | 40 rad/s | 5.0E4 |
| 10 | G" > G' | 1.4E5 | 10 rad/s | 4.8E4 | 50 rad/s | 5.3E4 |
| 11 | G' > G" | 1.6E7 | G" > G' | 1.1E5 | G" > G' | 1.2E4 |
| 12 | G' > G" | 7.4E6 | G" > G' | 1.3E5 | G" > G' | 1.6E4 |
| 13 | G' > G" | 1.4E6 | G" > G' | 1.0E5 | G" > G' | 1.4E4 |
| 14 | G' > G" | 7.4E6 | 5 rad/s | 1.2E6 | G" > G' | 6.8E4 |
| 15 | G' > G" | 1.0E7 | 8 rad/s | 8.9E5 | G" > G' | 6.0E4 |
| 16 | G' > G" | 6.8E6 | 5 rad/s | 8.6E5 | G" > G' | 7.1E4 |

G' > G" means: In the frequency range between 1 rad/s and 100 rad/s the storage modulus G' is always higher than the loss modulus G".
G' < G" means: In the frequency range between 1 rad/s and 100 rad/s the storage modulus G' is always lower than the loss modulus G"

All data in rad/s mean that the storage modulus G' and the loss modulus G" have the same value at this frequency. At a higher frequency the storage modulus G' is higher than the loss modulus; at a lower frequency the storage modulus G' is less than the loss modulus G".

The invention claimed is:

1. An aqueous adhesive composition comprising at least one acrylate polymer with a glass transition temperature in the range from 50° C. to 90° C. and at least one amorphous polyurethane or polyurethane-polyurea polymer with a glass transition temperature in the range from −50° C. to 10° C., the glass transition temperature being determined by a DSC measurement according to DIN 65467 at a heating rate of 20 K/min, wherein a dry film obtained from the aqueous composition after heat-activation at a temperature of greater than 50° C. and less than 90° C. is a pressure sensitive adhesive layer and wherein the said adhesive layer is not tacky if exposed to a temperature up to 50° C.

2. The aqueous adhesive composition of claim 1, wherein the acrylate polymer has a glass transition temperature in the range from 50° C. to 80° C.

3. The aqueous adhesive composition of claim 1, wherein the amorphous polyurethane or polyurethane-polyurea polymer has a glass transition temperature in the range from −50° C. to +5° C.

4. The aqueous adhesive composition of claim 1, wherein the polyurethane or polyurethane-polyurea polymer has a weight average molecular weight Mw in the range from 15,000 to 150,000 g/mol.

5. The aqueous adhesive composition of claim 1, wherein the polyurethane or polyurethane-polyurea polymer in the dispersion has an average particle diameter in the range from 30 to 400 nm.

6. The aqueous adhesive composition of claim 1, wherein the acrylate polymer has a weight average molecular weight Mw in the range from $10^3$ to $10^6$ g/mol.

7. The aqueous adhesive composition of claim 1, wherein the acrylate polymer has an average particle diameter in the range from 40 to 200 nm.

8. A method of manufacture of a heat-activated adhesive layer on a substrate which comprises applying the aqueous adhesive composition of claim 1 on the substrate.

9. The method of claim 8, wherein the heat-activated adhesive layer at 50° C. have a storage modulus G' at 1 rad/s of between $1*10^5$ Pa and $1*10^8$ Pa.

10. The method of claim 8, wherein the heat-activated adhesive layer at 70° C. have a storage modulus G' at 1 rad/s of between $1*10^4$ Pa and $1*10^7$ Pa.

11. The method of claim 8, wherein the heat-activated adhesive layer at 90° C. have a storage modulus G' at 1 rad/s of between $1*10^3$ Pa and $1*10^6$ Pa.

12. The method of claim 8, wherein the substrate is selected from paper, cardboard, wood, textile, metal, leather, mineral material, natural rubber, synthetic rubber, or synthetic material.

13. A planar formation comprising a heat-activated adhesive layer together with a substrate, wherein the adhesive layer contains the aqueous adhesive composition according to claim 1.

14. The planar formation of claim 13, wherein the substrate is paper or a plastic sheet that may optionally be printed on one side or both sides.

15. The planar formation of claim 13, wherein it is a label.

16. The planar formation of claim 15, wherein it is a label without a release paper or film ("linerless label").

17. A method for the manufacture of the planar formation of claim 13, which comprises applying the adhesive layer to the substrate with a layer thickness of 10 to 50 μm.

18. A method for the application of the planar formation of claim 13 to an object, which comprises heating the planar formation to a temperature ≥50° C. first and subsequently applying to the object.

19. The method of claim 18, wherein the object is heated to a temperature ≥50° C. first and subsequently the planar formation is applied.

20. The method of claim 19, wherein the planar formation and the object separately from each other are heated to a temperature ≥50° C. first and subsequently the planar formation is applied onto the object.

21. The method of claim 19, wherein the object is selected from the group of cardboard boxes, cans, bottles or plastic bags.

* * * * *